United States Patent [19]

Breyer

[11] Patent Number: 5,014,444
[45] Date of Patent: May 14, 1991

[54] PROBING DEVICE FOR A COORDINATE MEASURING APPARATUS

[75] Inventor: Karl-Hermann Breyer, Heidenheim, Fed. Rep. of Germany

[73] Assignee: Carl-Zeiss-Stiftung, Heidenheim, Fed. Rep. of Germany

[21] Appl. No.: 431,570

[22] Filed: Nov. 3, 1989

[30] Foreign Application Priority Data

Nov. 5, 1988 [DE] Fed. Rep. of Germany ... 8813875[U]

[51] Int. Cl.⁵ .............................................. G01B 21/04
[52] U.S. Cl. ........................................ 33/702; 33/503; 33/559; 33/556; 33/502
[58] Field of Search ................. 33/559, 560, 561, 556, 33/557, 558, 502, 503, 504, 832, 704, 702, DIG. 19

[56] References Cited

U.S. PATENT DOCUMENTS

| | | | |
|---|---|---|---|
| 3,142,120 | 7/1964 | Mottu | 33/702 |
| 3,332,153 | 7/1967 | Loewen | 33/702 |
| 3,921,300 | 11/1975 | Cox et al. | 33/702 |
| 4,637,119 | 1/1987 | Schneider et al. | 33/561 |
| 4,875,177 | 10/1989 | Jarman | 33/504 |

FOREIGN PATENT DOCUMENTS

| | | | |
|---|---|---|---|
| 3706610 | 9/1988 | Fed. Rep. of Germany | 33/702 |
| 3729644 | 3/1989 | Fed. Rep. of Germany | 33/702 |
| 0103367 | 8/1979 | Japan | 33/704 |
| 2083224 | 3/1982 | United Kingdom | 33/832 |
| 2165653 | 4/1986 | United Kingdom | 33/702 |

Primary Examiner—William A. Cuchlinski, Jr.
Assistant Examiner—Alvin Wirthlin
Attorney, Agent, or Firm—Walter Ottesen

[57] ABSTRACT

The invention is directed to a probing device for a coordinate measuring apparatus. The probe is exchangeable automatically via a probe changing device. The probing device has a temperature sensor which is in thermal contact with the material of the probing device. The connecting terminals of the sensor are applied to contacts on the exchange face of the probing device. In this way, it is possible to immediately determine the position of the sensing ball of the probe from the calibration data obtained at other temperatures after each probe exchange.

10 Claims, 2 Drawing Sheets

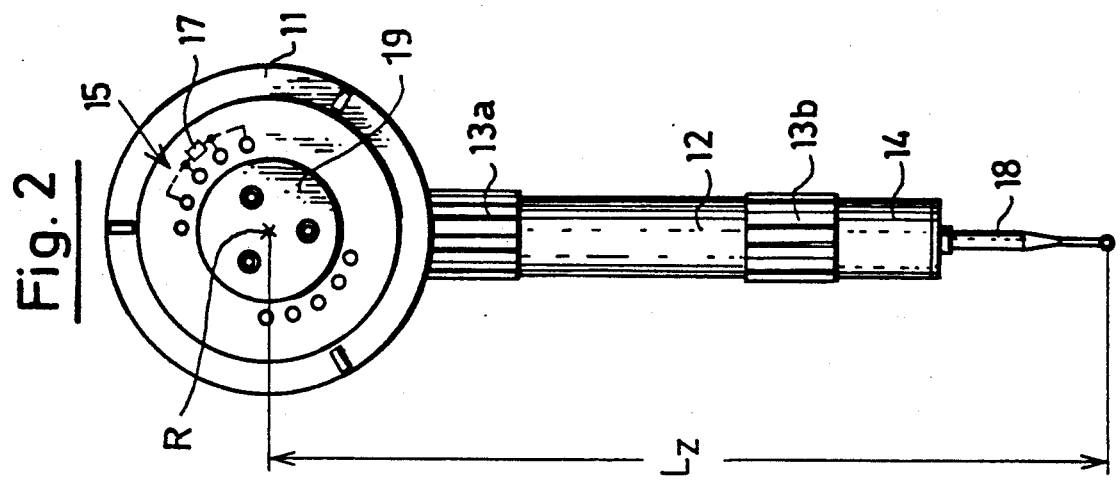
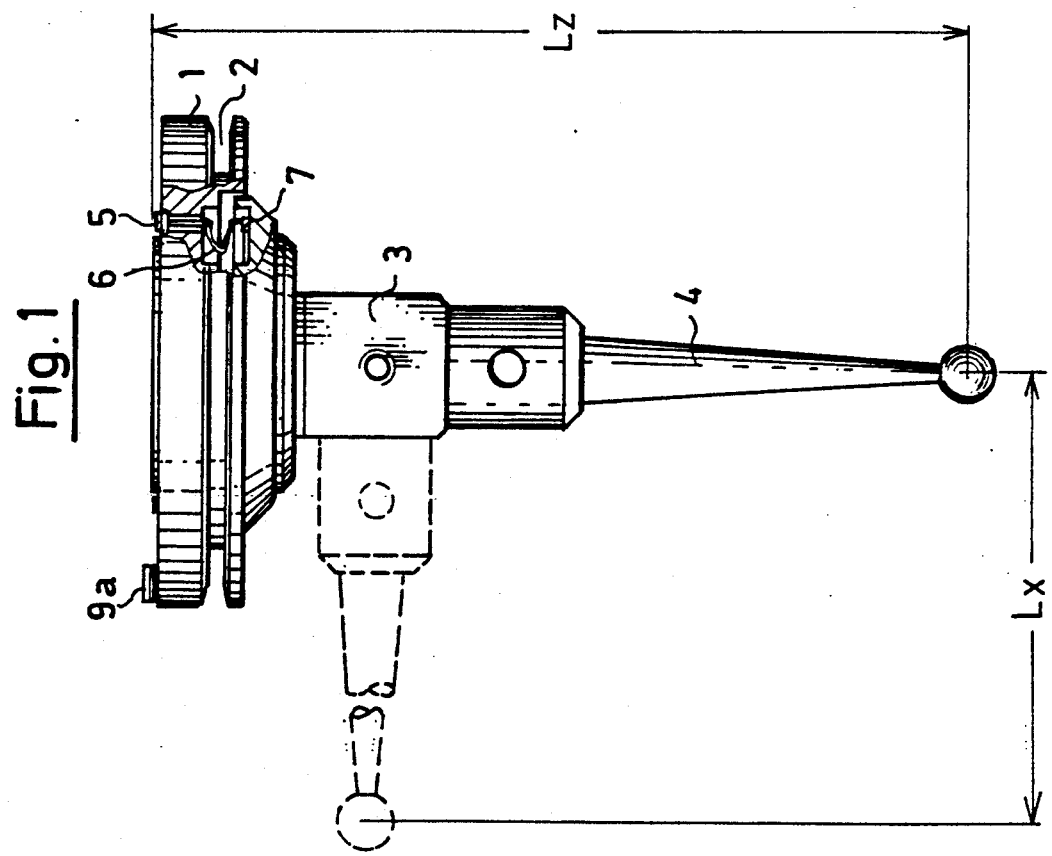

PROBING DEVICE FOR A COORDINATE MEASURING APPARATUS

FIELD OF THE INVENTION

The invention relates to a probing device for a coordinate measuring apparatus having an exchanging face for exchangeably attaching the probing device to the coordinate measuring apparatus.

BACKGROUND OF THE INVENTION

Coordinate measuring apparatus are utilized more and more in the immediate manufacturing area and are, for example, connected with the machine tools of a flexible manufacturing system.

However, it is not possible to carry out length measurements at a reference temperature of 20° C. in the manufacturing area. Measurements at the reference temperature can be carried out only in specially climatized measuring rooms. For this reason, the suggestion has already been made that the entire coordinate measuring apparatus in the manufacturing area be encapsulated in a climatized cabin. However, this requires a considerable effort and the cabin hinders the incoming supply of the workpieces to be measured.

The probing devices must be repeatedly calibrated in relatively short time intervals when measurements are made outside of the climatized rooms or cabins. Even a slight deviation of the reference temperature at which the calibration was once carried out leads to intolerable measurement errors because of the thermal linear expansion of the probing devices. An aluminum probing device having a length of 100 mm expands, for example, by 2.5 μm for a temperature increase of 1.1° C. This error can already exceed the permissible measurement uncertainties of the coordinate measuring apparatus used.

As a rule, for a measuring operation for a complete workpiece, several different probing devices are exchanged sequentially and these probing devices are taken either from a storage closet or from a magazine built up at the edge of the measuring area. For this reason, the temperature of the probing devices can change between measurements. Accordingly, a new calibration must be made after each probing device exchange in order to obtain accurate measurements. This slows the entire measuring operation and is especially disadvantageous in a manufacturing area where rapid measuring results are required.

The above-mentioned difficulties can be avoided by making the probing device from a material having a low expansion coefficient such as Invar. However, probe heads and probes made of Invar are more complex to manufacture. A conversion of the probing device to this material is therefore not possible in a simple manner.

SUMMARY OF THE INVENTION

It is an object of the invention to provide a probing device for a coordinate measuring apparatus which is configured to reduce the influence of the thermal length changes on the measuring result.

The probing device of the invention is for a coordinate measuring apparatus. The probing device includes: a structure made of a given material and defining the probing device; interface means formed on the structure for exchangeably mounting the probing device on the coordinate measuring apparatus; a temperature sensor having connecting terminals and being mounted in the structure so as to be in thermal contact with the material thereof; and, contacts connected to the connecting terminals of the temperature sensor and mounted on the interface means for transmitting electrical signal data from the temperature sensor to the measuring apparatus.

Thus, for probing devices according to the invention, a thermal length expansion is permissible and a subsequent correction of the measuring result is made with the temperature values which the sensor, integrated into the probing device, passes via the contacts at the exchange face to an appropriate electronic evaluation unit in the coordinate measuring apparatus. In this way, it is possible to utilize previously calibrated probes under changing ambient temperatures. The sensors sense the temperatures of the probing device with high precision because the sensors are in continuous thermal contact with the probing device. The interrogation of the probing device temperature therefore takes place in fractions of a second.

The probing device whose temperature is detected can either be a passive rigid sensing pin or a complete probe head. What is essential is that the linear expansion of all components between the exchange face and the probing element (the sensing ball) is detected.

When the probe head and the probe are made of a good heat-conductive material such as steel or aluminum, then it is adequate to seat the sensor in the plate-shaped holder. This holder is provided with an exchange face and is used to attach the probe head and the probe. The entire unit which is to be exchanged and consisting of the holder, probe head and probe take on the same temperature because of the thermal conductivity.

However, the probing device can even be a contactless measuring optical probe head. In probe heads of this type, the temperature in the interior of the housing influences the relative position of various components of the probe head to each other and thereby influences the precision of the distance measurements. Here, the temperature sensor is preferably seated in the housing of the probe head.

The temperature sensors can be measuring resistors which are preferably connected in a four-conductor circuit. With such sensors, the temperatures of other components of a coordinate measuring apparatus are detected such as the temperature of the scale. The circuit complexity can then be held to a minimum since the temperatures of the various measurement locations (scale, workpiece, probing device) can be interrogated and evaluated in the multiplex operation of a processor.

BRIEF DESCRIPTION OF THE DRAWINGS

The invention will now be described with reference to the drawings wherein:

FIG. 1 is a side elevation view of an exchangeable probing device wherein a portion thereof has been broken out to show the temperature sensor seated in the plate-like holder of the assembly;

FIG. 2 is a side elevation view of an exchangeable probing device viewed in the direction toward the exchange face thereof;

FIG. 3a is a perspective view of the housing of an exchangeable optical probe head; and, FIG. 3b is a schematic showing the essential components in the interior of the probe head of FIG. 3a.

DESCRIPTION OF THE PREFERRED EMBODIMENTS OF THE INVENTION

Figure 3A:
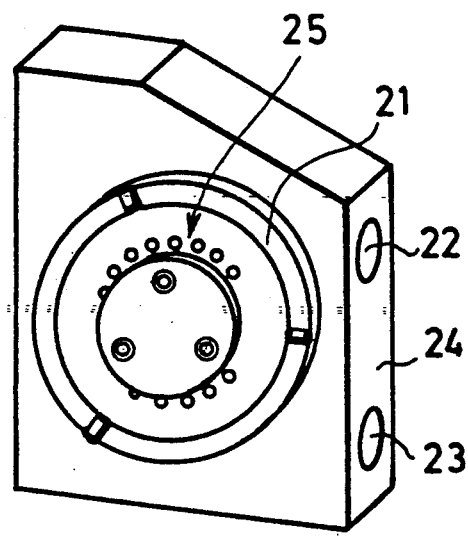

The probing device shown in FIG. 1 is, for example, exchanged automatically via a chucking device from a magazine built up at the edge of the measuring region of the particular coordinate measuring apparatus. For this purpose, an exchange plate or plate-shaped holder 1 is provided whereon three cylinders are arranged at its upper end face and spaced 120° C. apart from each other. Only one of the cylinders is shown in FIG. 1 and is therein identified by reference numeral 9a. With these three cylinders, the exchange plate comes into reproducible contact engagement with a corresponding counterbearing at the lower end of a probe head (not shown) on the coordinate measuring apparatus (not shown).

The exchange plate 1 carries an assembly cube 3 at its lower end on which up to five probes or probe combinations can be threadably engaged so as to extend out on all sides. In FIG. 1, a probe 4 is mounted on the lower face of the assembly cube 3.

The plate-shaped holder 1 is furthermore provided with a peripherally extending slot 2. A bifurcated carrier of the magazine in which the probing device is stored engages in this slot.

In the breakout shown in FIG. 1, a sensor 7 in the form of a platinum resistor is shown seated in the plate-shaped holder 1. This sensor 7 is in good thermal contact with the probe 4 as well as the remaining probes which can be mounted on the assembly cube 3 because of the good thermal conductivity of the metal material from which the parts (1, 3, 4) are manufactured.

The ends of the measuring resistor 7 are connected via leads 6 contact pins 5 at the upper end face of the plate-shaped holder 1. In this way, the voltage drop across the measuring resistor is transmitted to corresponding counter contacts in the probe head and can be evaluated by an electronic measuring unit which is connected downstream of the sensor 7.

After each exchange of a probing device, this electronic measuring unit determines the temperature of the exchanged probe combination and transmits this to the control computer of the coordinate measuring apparatus. There the difference of this temperature to the temperature at which the particular probe combination was calibrated is determined. The linear expansion to be corrected is computed in the control computer from this difference and by considering the probe lengths ($L_x$ or $L_z$) as well as the expansion coefficients of the probe material. Here it is assumed that the probe combination which is in place after an exchange expands linearly in all axial directions and that the angular position of the probe combination is always reproduced to be the same by the exchange operation. A recalibration of the probe is therefore not required.

In the embodiment of FIG. 2, a complete probing device is shown having a probe 18 journalled therein so as to yield. The probe 18 is connected to the plate-shaped holder 11 via an extension piece 12 and the plate-shaped holder 11 carries the exchange face for an automatic exchange on the measuring arm of a coordinate measuring apparatus. The housing portion 14 and the probe 18 conjointly define a sensing unit. The housing portion 14 of the probing device, the extension 12 and the exchange plate 11 as well as the sleeve nuts (13a and 13b) connecting the parts to each other are made of aluminum and are all at the same temperature because of the good thermal conductivity of the material. In a manner similar to the embodiment of FIG. 1, a temperature sensor 17 is integrated into the exchange plate 11 and is shown in phantom outline.

The temperature sensor 17 is also a measuring resistor and is operated in a four-conductor circuit. For this purpose, the terminals of the four-conductor circuit are in contact engagement with four of the contact pins 15 of the exchange plate 11. The contact pins 15 can be seen in FIG. 2.

A reference point R is provided on the exchange surface 19. The correction of the thermal linear expansion is obtained in that the distance $L_z$ of the sensing ball on the probe 18 from the reference point R is multiplied with the thermal expansion coefficient and the difference between the temperature measured via the measuring resistor 17 and the temperature at which the probe configuration was calibrated.

Figure 3B:
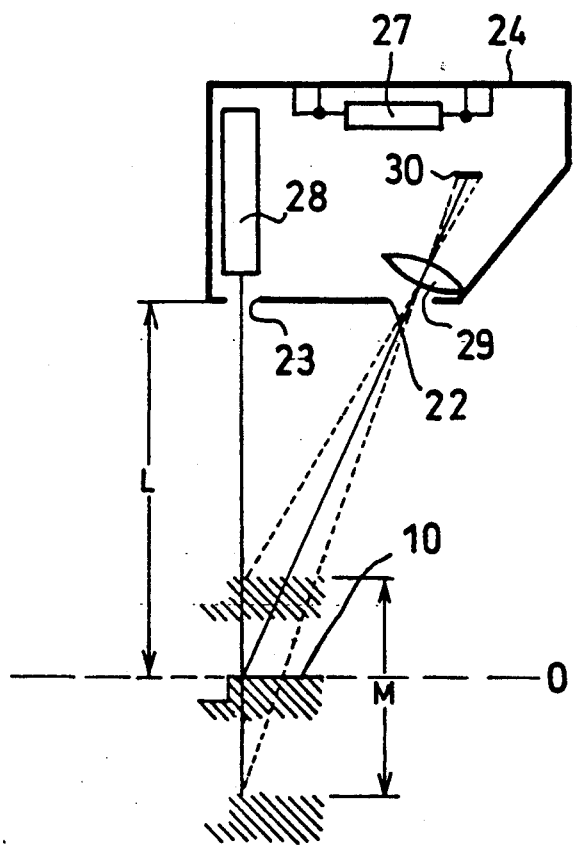

In the embodiment of FIG. 3, an optical probe head is shown which is exchangeable for the mechanical probing device of FIG. 2. The probe head in FIG. 3 is a so-called triangulation sensor and the configuration thereof is shown simplified in FIG. 3b. The triangulation sensor has a laser diode 28 from which a measuring point is prejected through aperture 23 onto the object 10 to be measured and an optic 29 which receives an image of the measuring region M via aperture 22 and, in turn, images the projected measuring point onto a diode array 30. The distance L to the object 10 is determined from the displacement of the measuring point on the diode array.

The linear thermal expansion or the distance of the probe head to the plate 21 is only of subordinate importance in sensors of this configuration. The exchange plate 21 is seated directly on the housing 24 of the sensor. In contrast, the mutual adjustments of the optoelectronic components to each other can change because of the heat losses arising in the probing device itself which, in turn, causes errors in the measurement of the distance. In order to avoid this condition, a temperature sensor in the form of a measuring resistor 27 is mounted in the housing 24 and has connecting terminals lying in contact engagement with four of the contacts 25 in the exchange plate 21. The temperature-dependent correction of the length measurement values of the probing device occurs in that, for example, the drift of the zero point of the measuring range for different temperatures is measured and stored in a memory table in the computer of the coordinate measuring apparatus. During the actual measuring program, the voltage dropping across the measuring resistor 27 is interrogated at regular intervals and in this way the actual temperature of the triangulation probing device is also interrogated and the distance measuring values are corrected by the values stored in the table.

It is understood that the foregoing description is that of the preferred embodiments of the invention and that various changes and modifications may be made thereto without departing from the spirit and scope of the invention as defined in the appended claims.

What is claimed is:

1. A probing device for coordinate measuring apparatus, the probing device comprising:
    said probing device being made of a given material and carrying a rigid probe;
    interface means fixed to said probing device for exchangeably mounting the probing device to said coordinate measuring apparatus;

a temperature sensor having connecting terminals and being mounted in said probing device so as to be in thermal contact with said material thereof for measuring the temperature of said probing device; and, contacts connected to said connecting terminals of said temperature sensor and mounted on said interface means for transmitting probing device temperature electrical signal data from said temperature sensor to said measuring apparatus.

2. The probing device of claim 1, further comprising: a holder and said interface means being formed on said holder; an assembly cube mounted on said holder; and, said probe mounted on said assembly cube.

3. The probing device of claim 2, further comprising: said holder being a plate-shaped holder and said interface means including a surface formed on said holder; and, said temperature sensor being seated in said holder.

4. The probing device of claim 1, said temperature sensor being a measuring resistor.

5. A probing device for coordinate measuring apparatus, the probing device comprising:
said probing device being made of a given material;
interface means formed on said probing device for exchangeably mounting the probing device on said coordinate measuring apparatus;
a temperature sensor having connecting terminals and being mounted in said probing device so as to be in thermal contact with said material thereof;
contacts connected to said connecting terminals of said temperature sensor and mounted on said interface means for transmitting electrical signal data from said temperature sensor to said measuring apparatus;
a plate-shaped holder and said interface means including a surface formed on said holder;
a sensing unit mounted on said holder;
said temperature sensor being seated in said holder;
said sensing unit including a housing portion and a probe connected to said housing portion; and,
said probing device further including an extension piece connecting said housing portion directly to said plate-shaped holder.

6. A probing device for coordinate measuring apparatus, the probing device comprising:
said probing device being made of a given material and carrying a probe mounted thereon so as to yield.
interface means fixed to said probing device for exchangeably mounting said probing device to said coordinate measuring apparatus;
a temperature sensor having connecting terminals and being mounted in said probing device so as to be in thermal contact with said material for measuring the temperature of said material; and, contacts connected to said connecting terminals of said temperature sensor and mounted on said interface means for transmitting probing device temperature electrical signal data from said temperature sensor to said measuring apparatus.

7. The probing device of claim 6, further including: a plate-shaped holder and said interface means including a surface formed on said holder; a housing mounted between said holder and said probe; and, said temperature sensor being seated in said holder.

8. The probing device of claim 6, said temperature sensor being a measuring resistor.

9. A probing device for coordinate measuring apparatus, the probing device comprising:
said probing device being made of a given material and carrying a probe mounted thereon so as to yield;
interface means fixed to said probing device for exchangeably mounting said probing device to said coordinate measuring apparatus;
a temperature sensor having connecting terminals and being mounted in said probing device so as to be in thermal contact with said material for measuring the temperature of said material; and,
contacts connected to said connecting terminals of said temperature sensor and mounted on said interface means for transmitting probing device temperature electrical signal data from said temperature sensor to said measuring apparatus;
a plate-shaped holder and said interface means including a surface formed on said holder; a sensing unit mounted on said holder; and,
said temperature sensor being seated in said holder;
said sensing unit including a housing portion and said probe connected to said housing portion; and,
said probing device further including an extension piece connecting said housing portion directly to said plate-shaped holder.

10. A probing device for a coordinate measuring apparatus, the probing device comprising:
said probing device being made of a given material;
interface means fixed to said probing device for exchangeably mounting said probing device to said coordinate measuring apparatus;
a temperature sensor having connecting terminals and being mounted in said probing device so as to be in thermal contact with said material of which said probing device is made for measuring the temperature of said material; and,
electrical contacts connected to said connecting terminals of said temperature sensor and mounted on said interface means for transmitting an electrical signal representing the temperature of said probing device to said measuring apparatus.

* * * * *

UNITED STATES PATENT AND TRADEMARK OFFICE
CERTIFICATE OF CORRECTION

PATENT NO. : 5,014,444
DATED : May 14, 1991
INVENTOR(S) : Karl-Hermann Breyer It is certified that error appears in the above-identified patent and that said Letters Patent is hereby corrected as shown below:

In column 2, line 22: delete "sensing pin" and substitute -- probe pin -- therefor.

In column 3, line 10: delete "120° C" and substitute -- 120° -- therefor.

In column 3, line 35: between "leads 6" and "contact pins 5" insert -- to --.

In column 5, line 48: delete "yield." and substitute -- yield; -- therefor.

Signed and Sealed this

Eighteenth Day of May, 1993

Attest:

MICHAEL K. KIRK

*Attesting Officer*    Acting Commissioner of Patents and Trademarks